United States Patent [19]

Suzuki

[11] Patent Number: 4,709,257

[45] Date of Patent: Nov. 24, 1987

[54] COLOR SIGNAL DEMODULATION APPARATUS

[75] Inventor: Norio Suzuki, Tokyo, Japan

[73] Assignee: NEC Corporation, Japan

[21] Appl. No.: 892,242

[22] Filed: Jul. 31, 1986

[30] Foreign Application Priority Data

Aug. 7, 1985 [JP] Japan .................................. 60-172373

[51] Int. Cl.$^4$ ............................................... H04N 9/66
[52] U.S. Cl. ..................................................... 358/23
[58] Field of Search .......................................... 358/23

[56] References Cited

U.S. PATENT DOCUMENTS 4,502,074  2/1985  Reitmeier ............................... 358/23
4,527,188  7/1985  Lewis, Jr. ............................... 358/23
4,625,232 11/1986  Nillesen .................................. 358/23

OTHER PUBLICATIONS

SMPTE Journal, Oct. 1981, pp. 942-944, "Digital Decoding and Encoding of the NTSC Signal at 912 Sample per Line".

Primary Examiner—Michael A. Masinick
Attorney, Agent, or Firm—Laff, Whitesel, Conte & Saret

[57] ABSTRACT

A color signal demodulation apparatus includes an A/D converter for converting a composite color television signal into a digital signal, a pulse generator for generating timing pulses and sampling clocks, a Y/C separator for separating the output from the A/D converter into a luminance signal and a carrier chrominance signal, a subcarrier generator for detecting the phase of the subcarrier from the color burst signal, and a color signal demodulator for obtaining baseband color signals. The apparatus of the invention requires no low-pass filter.

6 Claims, 3 Drawing Figures

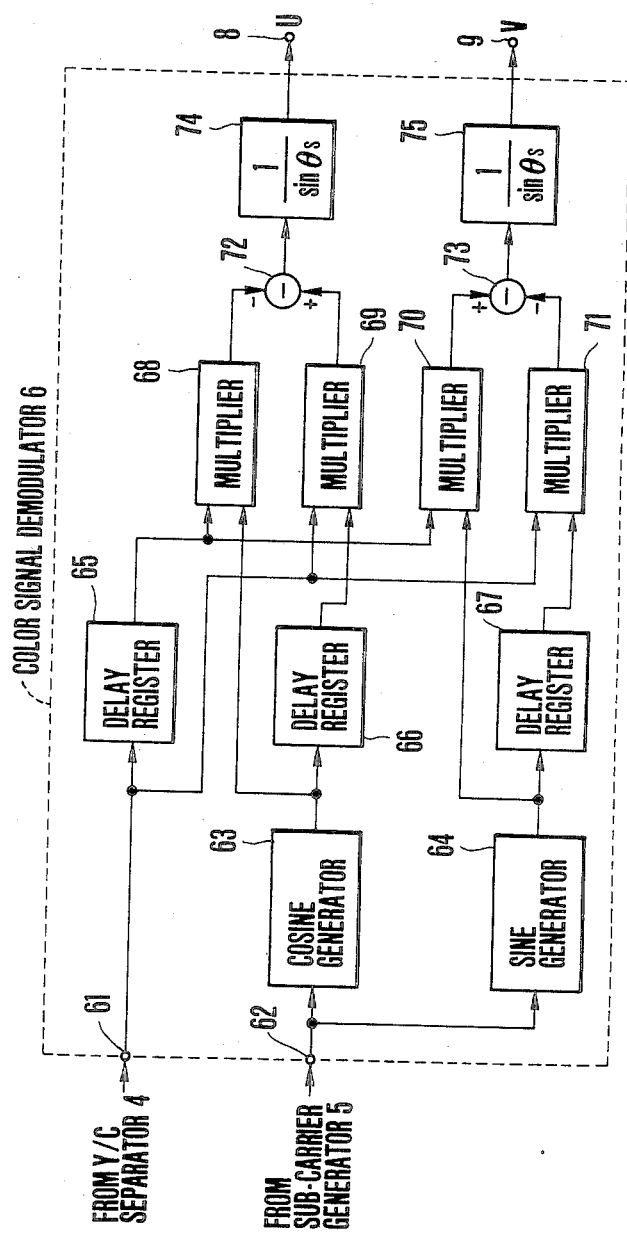

COLOR SIGNAL DEMODULATION APPARATUS

BACKGROUND OF THE INVENTION

The present invention relates to a color signal demodulation apparatus which obtains a baseband color signal from a composite color television signal.

Conventionally, in order to obtain a color signal from a composite color television signal, synchronous demodulation is performed using a Y/C separated carrier chrominance signal C and a subcarrier reproduced from a color burst signal, and the resultant signal is waveshaped through a low-pass filter. In recent years, the conventional method is performed with a digital circuit to improve its stabilization, as described in an article entitled "Digital Decoding and Encoding of the NTSC Signal at 912 Samples per Line", SMPTE Journal, October 1981, pp. 942–944.

However, since such a conventional apparatus requires a low-pass filter, it cannot be compact in size.

SUMMARY OF THE INVENTION

It is an object of the present invention to provide a compact color signal demodulation apparatus which is free from the conventional drawbacks and requires no low-pass filter.

According to the present invention, there is provided a color signal demodulation circuit comprising: means for obtaining a sampled value of a carrier chrominance signal from a composite color television signal; means for obtaining a phase angle signal of a subcarrier at the same sampling time as that of the carrier chrominance signal; and means for obtaining a baseband color signal based on the sampled value of the carrier chrominance signal and the phase angle signal of the subcarrier.

BRIEF DESCRIPTION OF THE DRAWINGS

FIG. 3 is a detailed block diagram of a color signal demodulator 6 shown in FIG. 1.

DETAILED DESCRIPTION OF THE PREFERRED EMBODIMENT

In order to make easier the understanding of the present invention, the principle of the present invention will be described prior to the detailed description of the preferred embodiment.

Assuming that a phase angle of a subcarrier is represented by $\theta_n$ at a given sampling time $t_n$, a carrier chrominance signal C obtained by balanced-modulating the subcarrier using color signals U and V is expressed by the following equation (where suffixes indicate that these are sampled values at the time $t_n$):

$$C_n = U_n \cdot \sin \theta_n + V_n \cdot \cos \theta_n \quad \ldots (1)$$

At a time $t_{n+1}$, the carrier chrominance signal is expressed by:

$$C_{n+1} = U_{n+1} \cdot \sin \theta_{n+1} + V_{n+1} \cdot \cos \theta_{n+1} \quad \ldots (2)$$

Since the color signals during a sampling period ($Ts = t_{n+1} - t_n$) can be regarded to be constant, Equations (1) and (2) are solved for $U_n$ and $V_n$ using the relations $U_n = U_{n+1}$ and $V_n = V_{n+1}$ as follows:

$$U_n = -(C_n \cdot \cos \theta_{n+1} - C_{n+1} \cdot \cos \theta_n)/\sin(\theta_{n+1} - \theta_n) \quad \ldots (3)$$

$$V_n = (C_n \cdot \sin \theta_{n+1} - C_{n+1} \cdot \sin \theta_n)/\sin(\theta_{n+1} - \theta_n) \quad \ldots (4)$$

In other words, if the sampled values of the carrier chrominance signal C and the phase angle $\theta$ of the subcarrier are detected at the sampling times $t_n$ and $t_{n+1}$, the color signals $U_n$ and $V_n$ at the time $t_n$ can be obtained therefrom.

Figure 1:
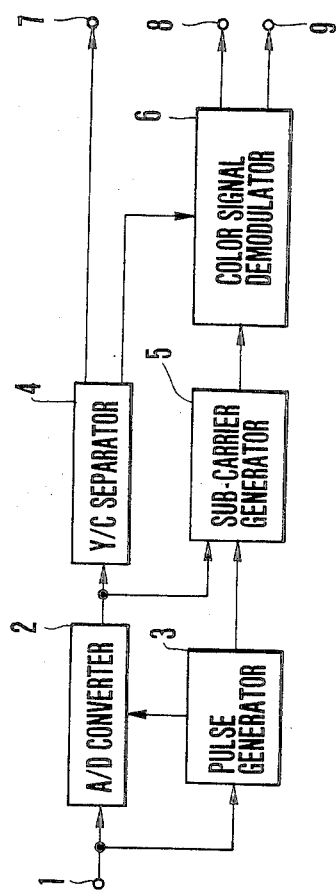
FIG. 1 is a block diagram showing an embodiment of the present invention.

FIG. 1 is a block diagram showing an embodiment of a digital color signal demodulation apparatus according to the present invention. Referring to FIG. 1, reference numeral 2 denotes an A/D converter for converting a composite color television signal input from an input terminal 1 into a digital signal; 3, a pulse generator for generating necessary timing pulses and sampling clocks whose frequency has an appropriate fraction ratio with respect to that of a horizontal sync signal or a color subcarrier of the composite color television signal; and 4, a Y/C separator for separating the output from the A/D converter 2 into a luminance signal Y and a carrier chrominance signal C by means of a band-pass filter (BPF) or a comb filter utilizing line correlation. Reference numeral 5 denotes a subcarrier generator which receives the outputs from the A/D converter 2 and the pulse generator 3 to detect the phase of the subcarrier from the color burst signal and to generate a color subcarrier phase angle signal $\theta$ at each sampling time; and 6, a color signal demodulator which receives the carrier chrominance signal C output from the Y/C separator 4 and the color subcarrier phase angle signal $\theta$ to obtain baseband color signals U and V in accordance with Equations (3) and (4).

The luminance signal Y and the demodulated color signals U and V respectively appear at output terminals 7, 8, and 9.

The operation of the embodiment shown in FIG. 1 will now be described. An NTSC composite color television signal input to the A/D converter 2 is converted into a digital signal in accordance with a sampling clock pulse at, e.g., a sampling frequency fs = 13.5 MHz (fs = 858 fH, fH is a horizontal sync frequency) supplied from the pulse generator 3, and is then supplied to the Y/C separator 4 and the subcarrier generator 5. When a composite color television signal is an NTSC signal, since the subcarrier is phase-inverted for each line, the Y/C separator 4 separates the luminance signal Y and the carrier chrominance signal therefrom by means of a comb filter using a line memory and a BPF which allows a signal component near the subcarrier to pass therethrough. The Y/C separator 4 supplies the carrier chrominance signal to the color demodulator 6. The subcarrier generator 5 detects the phase of the subcarrier from the color burst signal, and increments for each sampling clock the phase angle of the subcarrier by a constant value $\theta_s$ ($\theta_s = 2\pi \times fsc/fs$ where fsc is a color subcarrier frequency) with respect to the detected phase angle of the color burst signal, thereby generating a color subcarrier phase angle signal phase-locked with the color burst signal. The color subcarrier phase angle signal is supplied to the color signal demodulator 6. The color signal demodulator 6 performs operational processing using the carrier chrominance signal C supplied from the Y/C separator 4 and the subcarrier phase angle signal $\theta$ supplied from the subcarrier generator 5 in accordance with Equations (3) and (4) to obtain the color signals U and V. The color signal demodulator 6 respectively supplies color signals U and V to the output terminals 8 and 9.

Figure 2:
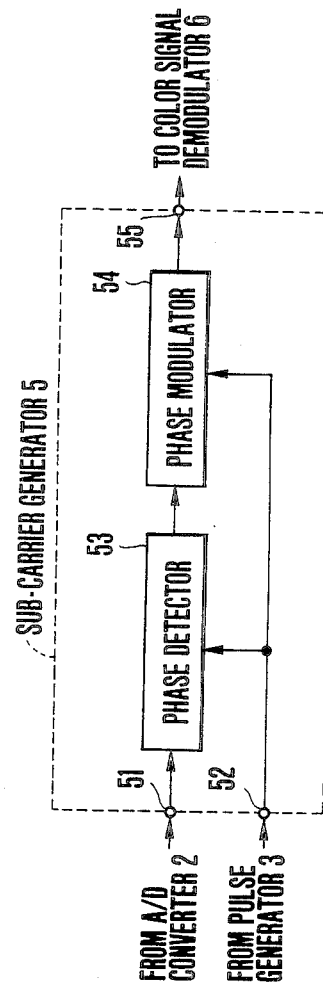
FIG. 2 is a detailed block diagram of a subcarrier generator 3 shown in FIG. 1.

FIG. 2 is a detailed block diagram of the subcarrier generator 5. The carrier chrominance signal C is represented by an amplitude R and a phase angle $\phi$, and sampled values $C_n$ and $C_{n+1}$ of the carrier chrominance signals sampled at sampling times $t_n$ and $t_{n+1}$ are defined by the following equations:

$$C_n = R_n \sin\phi_n \quad (5)$$

$$C_{n+1} = R_{n+1}\sin\phi_{n+1} \quad (6)$$
$$= R_{n+1}\sin(\phi_n + \theta_s)$$

where $\theta_s = 2\pi \times fsc/fs$. Since the amplitudes of the color signals at the times $t_n$ and $t_{n+1}$ are substantially constant, when Equations (5) and (6) are solved for $\phi_n$ for $R_n = R_{n+1}$, we have:

$$\theta_n = \tan^{-1}\{(C_n \cdot \sin\theta_s)/(C_{n+1} - C_n \cdot \cos\theta_s)\} \quad \ldots (7)$$

In this manner, the phase angle at the time $t_n$ can be obtained from the sampled values $C_n$ and $C_{n+1}$ of the continuous carrier chrominance signals. Therefore, in an NTSC color television signal, since the phase of the color burst signal advances from a reference phase axis of the subcarrier by $\pi$, the phase angle can be obtained from components of the color burst signal and $\pi$ can be subtracted therefrom to obtain the phase angle of the color subcarrier at a given time. A phase detector 53 has a circuit for obtaining a carrier chrominance signal during a color burst interval, and a converter for generating a phase angle $\phi_n$ from the carrier chrominance signals $C_n$ and $C_{n+1}$ in accordance with Equation (7), e.g., a read-only memory (ROM) which receives the $C_n$ and $C_{n+1}$ to generate the angle $\phi_n$. Since a single detection result may include an error, the detection results over a plurality of lines are averaged to obtain a final result. The obtained color burst phase angle signal is supplied to a phase modulator 54, and is incremented by a phase angle of $\theta_s$ for each sampling clock to be generated as a subcarrier phase angle signal. Assuming that the phase angle of the color subcarrier at time $t_0$ is given by $\theta_0$, the subcarrier phase angle signal $\theta_n$ at time $t_n$ is generated in accordance with the relation $\theta_n = n \cdot \theta_s + \theta_0$. In this embodiment, the sampling frequency is fs = 858 fH, and the composite color television signal is an NTSC signal. Therefore, the subcarrier phases of the sampling points coincide with each other for every other line. The value of n can be reset for every other line.

FIG. 3 is a detailed block diagram of the color signal demodulator 6. Reference numeral 63 denotes a cosine generator for generating a value of $\cos\theta$ in response to an input $\theta$; 64, a sine generator for generating a value of $\sin\theta$ in response to the input $\theta$; 65, 66, and 67, delay registers for delaying an input signal by a period corresponding to a single sampling clock; and 74 and 75, amplifiers having a gain of $1/\sin\theta_s$. These components constitute a digital signal processing circuit. At time $t_{n+1}$, when a carrier chrominance signal $C_{n+1}$ and a subcarrier phase angle signal $\theta_{n+1}$ are input, a $\cos\theta_{n+1}$ signal appears at the output of the cosine generator 63, and a $\sin\theta_{n+1}$ signal appears at the output of the sine generator 64. The carrier chrominance signal $C_n$, the $\cos\theta_n$ signal, and the $\sin\theta_n$ at at time $t_n$ respectively appear at the outputs of the delay registers 65, 66, and 67. Four pairs of signals respectively supplied to multipliers 68, 69, 70, and 71 are subjected to multiplication, and the products of the multipliers 68 and 69 are supplied to the subtractor 72 and the products of the multipliers 70 and 71 are supplied to the subtractor 73. The subtraction results are respectively supplied to the amplifiers 74 and 75, and are amplified at a gain of $1/\sin\theta_s$ to be output therefrom. As a result, the color signal U obtained in accordance with Equation (3) and the color signal V obtained in accordance with Equation (4) respectively appear at the outputs of the amplifiers 74 and 75.

Note that in FIG. 1, the subcarrier generator 5 can have a circuit arrangement wherein a subcarrier phase angle is generated using the carrier chrominance signal C generated from the Y/C separator 4 and the signal from the pulse generator 3.

According to the present invention as described above, since the color demodulator is constituted in accordance with Equations (3) and (4), the baseband color signals can be obtained, and no low-pass filter (LPF) is required unlike the conventional color signal demodulation method using a sync demodulation scheme, resulting in simple demodulation and compact arrangement.

What is claimed is:

1. A color signal demodulation apparatus comprising: means for obtaining a sampled value of a carrier chrominance signal from a composite color television signal; means for obtaining a phase angle signal of a subcarrier at the same sampling time as that of the carrier chrominance signal; and means for obtaining a baseband color signal based on the sampled value of the carrier chrominance signal and the phase angle signal of the subcarrier.

2. An apparatus according to claim 1, wherein said means for obtaining the baseband color signal receives carrier chrominance signals indicated by $C_n$ and $C_{n+1}$ at sampling times $t_n$ and $t_{n+1}$ and phase angles of subcarriers indicated by $\theta_n$ and $\theta_{n+1}$ at the sampling times $t_n$ and $t_{n+1}$, and calculates the following equations to obtain baseband color signals $U_n$ and $V_n$ at the sampling time $t_n$:

$$U_n = -(C_n \cdot \cos\theta_{n+1} - C_{n+1} \cdot \cos\theta_n)/\sin(\theta_{n+1} - \theta_n)$$

$$V_n = (C_n \cdot \sin\theta_{n+1} - C_{n+1} \cdot \sin\theta_n)/\sin(\theta_{n+1} - \theta_n)$$

3. An apparatus according to claim 2, wherein said means for obtaining the baseband color signal comprises: a first delay circuit for delaying the carrier chrominance signal $C_n$ by a predetermined period of time to obtain a carrier chrominance signal $C_{n+1}$; a cosine generator which receives the phase angle $\theta_n$ to obtain $\cos\theta_n$; a sine generator which receives the phase angle $\theta_n$ to obtain $\sin\theta_n$; second and third delay circuits for delaying the outputs from said cosine generator and said sine generator by a predetermined period of time to obtain $\cos\theta_{n+1}$ and $\sin\theta_{n+1}$; first and second multipliers for multiplying the carrier chrominance signal $C_n$ respectively with the outputs from said second and third delay circuits; third and fourth multipliers for multiplying the output from said first delay circuit respectively with the outputs from said cosine generator and said sine generator; a first subtractor for subtracting the output of said third multiplier from the output of said first multiplier; a second subtractor for subtracting the output of said second multiplier from the output of said fourth multiplier; and fifth and sixth multipliers for multiplying the outputs from said first and second subtractors respectively with $1/\sin(\theta_{n+1}-\theta_n)$ to output the baseband color signals $U_n$ and $V_n$.

4. An apparatus according to claim 1, wherein said means for obtaining the phase angle of the subcarrier comprises: a circuit for obtaining two carrier chrominance signals at two adjacent sampling times during a color burst period; a converter for generating a reference subcarrier phase angle based on the two carrier chrominance signals through predetermined processing; and a phase modulation circuit which increments the output from said converter by a predetermined phase angle for each sampling clock to generate a subcarrier phase angle signal.

5. An apparatus according to claim 3, wherein each of said fifth and sixth multipliers for multiplying with $1/\sin(\theta_{n+1}-\theta_n)$ is an amplifier having a gain of $1/\sin \theta_s$, where $\theta_s = 2\pi \times fsc/fs$: fsc is a subcarrier frequency and fs is a sampling frequency.

6. An apparatus according to claim 4, wherein said converter is a read-only memory for outputting:

$$\phi_n = \tan^{-1}\{(C_n \cdot \sin \theta_s)/(C_{n+1} - C_n \cdot \cos \theta_s)\}$$

based on the sampled values $C_n$ and $C_{n+1}$ of the carrier chrominance signals and the predetermined phase angle $\theta_s (= 2\pi \times fsc/fs)$.

* * * * *